F. HULLHORST.
Vegetable Cutter.
No. 46,002. Patented Jan'y 24, 1865.
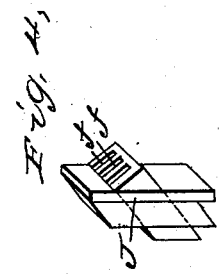
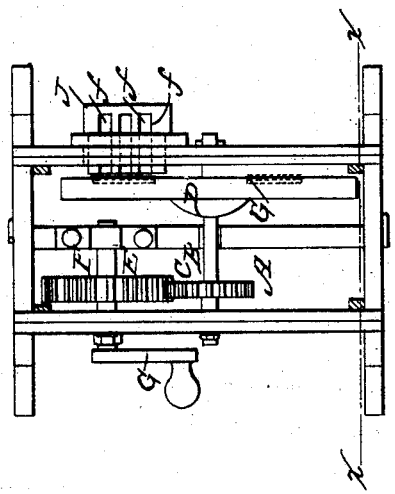
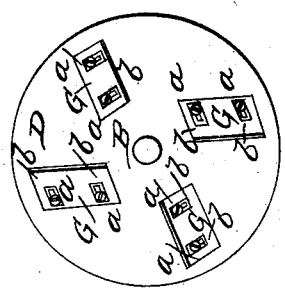
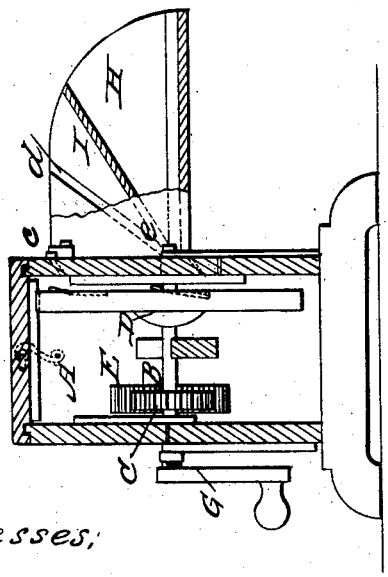
Witnesses:
Inventor:

UNITED STATES PATENT OFFICE.

FR. HULLHORST, OF FREEPORT, ILLINOIS.

IMPROVED VEGETABLE-CUTTER.

Specification forming part of Letters Patent No. 46,002, dated January 24, 1865.

*To all whom it may concern:*

Be it known that I, F. HULLHORST, of Freeport, in the county of Stephenson and State of Illinois, have invented a new and Improved Vegetable-Cutter; and I do hereby declare that the following is a full, clear, and exact description thereof, which will enable others skilled in the art to make and use the same, reference being had to the accompanying drawings, forming a part of this specification, in which—

Figure 1 is a side sectional view of my invention, taken in the line $x\ x$, Fig. 2.; Fig. 2, a plan or top view of the same; Fig. 3, a detached face view of the cutting-wheel pertaining to the same; Fig. 4, a detached perspective view of a feed-box pertaining to the same.

Similar letters of reference indicate like parts.

This invention relates to a new and improved machine for cutting vegetables of various kinds, both for fodder for stock and for family use.

The invention consists in a cutting-wheel and changeable feed-boxes arranged with a suitable case, as hereinafter fully shown and described, whereby a simple and economical implement is obtained for the purpose, and one which may be readily cleansed and kept in proper working order.

A represents a rectangular box or case of any suitable dimensions, and B is a shaft which is placed horizontally and transversely in the case A, and has upon it a pinion, C, and a cutting-wheel, D, the latter being near one side of the box or case, as shown in Figs. 1 and 2. The pinion C gears into a wheel, E, on a shaft, F, which is also within the box or case A, and extends through one side of the same, and has a crank, G, upon it for the convenience of turning it when manual power is used. A pulley or toothed wheel is placed on said shaft when the implement is driven by power. The wheel E, which is considerably larger in diameter than the pinion C, causes the shaft B to rotate more rapidly than the shaft F, so that the cutting-wheel D may have a requisite speed. This cutting-wheel has openings made in it of rectangular form, to serve as throats for cutters G, which are secured to the wheel D by screws $a$, passing through oblong slots $b$ in the cutters into the wheel. By this arrangement the cutters G are rendered adjustable to compensate for wear. The cutters G are attached to the side of the wheel opposite to the side of the box to which the wheel D is nearest, as shown in Figs. 1 and 2.

H represents a feed-box, which is secured to one side of the box or case A by buttons $c$, and communicates with the box or case directly opposite the face or cutter side of wheel D. This feed-box is provided with a slide, I, which may be fitted in any one of two or more sets of grooves, $d$, in the feed-box, to vary the capacity of the latter and inclination of the slide according to the kind of vegetables to be cut. For instance, if potatoes are to be cut, the slide I is fitted in the uppermost grooves. If cabbages are to be cut, the slide is fitted in the grooves next below. By removing the slide from the feed-box entirely, cucumbers and similar long-shaped vegetables may be cut. The grooves $d$ at each side of the feed-box radiate from one and the same point $e$, at each side of the lower front end of the feed-box.

In cutting beans and similar small vegetables I employ a smaller feed-box, J, which is provided with a series of small inclined troughs, $f$, as shown in Fig. 4, the box H being removed and J inserted in its place.

In using the device the vegetables are cut or sliced by pressing against the cutting-wheel D.

The device is extremely simple and efficient, may be constructed at a small cost, and it possesses no parts which are liable to get out of repair.

Having thus described my invention, I claim as new and desire to secure by Letters Patent—

The combination of the changeable feed-boxes H $d$ I and J $f f$ with the cutting-wheel D G and casing A, all arranged to operate as specified.

FR. HULLHORST.

Witnesses:
 MARTIN EMMERT,
 EDWARD HULLHORST.